United States Patent
Nguyen et al.

(10) Patent No.: US 7,498,782 B2
(45) Date of Patent: Mar. 3, 2009

(54) COMPUTER SYSTEMS AND VOLTAGE REGULATOR CIRCUITS WITH TOROIDAL INDUCTORS

(75) Inventors: Don Nguyen, Portland, OR (US);
Thovane Solivan, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 549 days.

(21) Appl. No.: 11/173,805

(22) Filed: Jun. 30, 2005

(65) Prior Publication Data

US 2007/0001658 A1 Jan. 4, 2007

(51) Int. Cl.
*G05F 1/40* (2006.01)
*G05F 1/56* (2006.01)

(52) U.S. Cl. ...................... 323/282; 323/271

(58) Field of Classification Search .......... 323/222, 323/247–250, 259, 268, 271, 272, 282, 290
See application file for complete search history.

(56) References Cited

U.S. PATENT DOCUMENTS

| | | | |
|---|---|---|---|
| 5,939,870 A | 8/1999 | Nguyen et al. | |
| 5,982,161 A | 11/1999 | Nguyen et al. | |
| 6,043,634 A | 3/2000 | Nguyen et al. | |
| 6,188,206 B1 | 2/2001 | Nguyen et al. | |
| 6,307,355 B1 | 10/2001 | Nguyen | |
| 6,362,608 B1 * | 3/2002 | Ashburn et al. ............. 323/272 |
| 6,362,986 B1 | 3/2002 | Schultz et al. | |
| 6,366,069 B1 | 4/2002 | Nguyen et al. | |
| 6,380,722 B2 | 4/2002 | Wickersham | |
| 6,448,746 B1 | 9/2002 | Carlson | |
| 6,510,065 B1 | 1/2003 | Massie et al. | |
| 6,534,962 B1 * | 3/2003 | Lee ............................ 323/290 |
| 6,611,435 B2 | 8/2003 | Kumar et al. | |
| 6,696,823 B2 | 2/2004 | Ledenev et al. | |
| 6,784,647 B2 | 8/2004 | Nguyen et al. | |
| 6,788,558 B2 * | 9/2004 | Pelly ............................ 363/40 |
| 6,833,983 B2 | 12/2004 | Nguyen et al. | |
| 6,879,489 B2 | 4/2005 | Koertzen | |
| 7,098,726 B2 | 8/2006 | Nguyen et al. | |
| 2004/0113741 A1 | 6/2004 | Li et al. | |
| 2006/0082353 A1 | 4/2006 | Solivan et al. | |

OTHER PUBLICATIONS

"Powder Cores Manual", *Magnetics, 2004/2005 Catalog*, (2004), 79 pages.

Li, Jieli, et al., "Coupled-inductor design optimization for fast-response low-voltage DC-DC converters", *Seventeenth Annual IEEE Applied Power Electronics Conference and Exposition*, 2002. APEC 2002, vol. 2, (Mar. 10-14, 2002),817-823.

Li, Jieli, et al., "Using coupled inductors to enhance transient performance of multi-phase buck converters", *19th Annual IEEE Applied Power Electronics Conference and Exposition—APEC 2004*, (2004), 1289-1293.

Prabhakaran, Satish, et al., "Microfabricated coupled inductors for integrated power converters", *Journal of Magnetism and Magnetic Materials, Proceedings of the Joint European Magnetic Symposia—JEMS' 04* v 290-291 Part 2, (Apr. 2005),1343-1346.

(Continued)

*Primary Examiner*—Matthew V Nguyen
(74) *Attorney, Agent, or Firm*—Schwegman, Lundberg & Woessner, P.A.

(57) ABSTRACT

In one embodiment, a computing system includes a switching voltage regulator having at least two inductors formed on a common toroidal core.

13 Claims, 2 Drawing Sheets

OTHER PUBLICATIONS

Wong, Pit-Leong, et al., "Performance improvements of interleaving VRMs with coupling inductors", *IEEE Transactions on Power Electronics*, 16(4), (Jul. 2001),499-507.

Zumel, P, et al., "Magnetic integration for interleaved converters", *Eighteenth Annual IEEE Applied Power Electronics Conference and Exposition*, 2003. APEC '03, vol. 2, (Feb. 9-13, 2003),1143-1149.

* cited by examiner

COMPUTER SYSTEMS AND VOLTAGE REGULATOR CIRCUITS WITH TOROIDAL INDUCTORS

TECHNICAL FIELD

Various embodiments of the present invention concern voltage regulators, for example, voltage regulators used in computing devices, such as notebook computers.

BACKGROUND

Notebook computers are portable computing devices that have become very popular in recent years. Two components that contribute to their portability are the battery and the voltage regulator.

The battery supplies electrical power to the device, typically at a voltage level of 9-13 volts. However, this voltage level is typically higher than the voltage needed by many of the components in these devices. For example, a microprocessor—the brains of the computer—typically operates on approximately one to two volts. Converting the battery voltage to the right level for any given component is the job of the voltage regulator.

In addition to converting the voltage, the voltage regulator has the job of reducing fluctuations in its output voltage as demand for power fluctuates in response to changes in component workload. For example, when a microprocessor shifts from idle to active, it pulls the regulator output voltage downward from its desired level, and conversely, when the microprocessor shifts from active to idle, it pushes the regulator output voltage upward. In either case, a properly functioning voltage regulator quickly responds to the changing load conditions by increasing or decreasing its output voltage to counteract effects of loading. A consequence of the changing load and voltage levels is that the regulator output voltage generally ripples or oscillates back and forth about its desired voltage.

To reduce the magnitude of these ripples and their undesirable effects on processor operations, many computing devices employ a multi-phase voltage regulator. These multi-phase voltage regulators often include two or more separate inductors that are connected so that ripples at the output of one phase are opposite in direction or polarity to ripples on the other phase. The outputs of the two phases are added together, with the opposing ripples partially canceling each other and reducing the magnitude of ripples that reach the microprocessor.

At least one problem recognized by the inventors is that conventional multi-phase voltage regulators often use separate inductors which not only occupy significant space on the motherboard—that is, the printed circuit board that carries many components of the computer system—but also necessitate the use of other large components, such as several 300 microfarad capacitors. Thus, the use of separate inductors ultimately limits the ability of manufacturers to further reduce the size of the motherboard or to add other components to the same size motherboard.

Accordingly, the inventors have recognized a need for alternative circuitry for voltage regulators.

DETAILED DESCRIPTION OF EXEMPLARY EMBODIMENTS

This description, which references and incorporates the above-identified Figures and incorporates the appended claims, describes one or more specific embodiments of an invention. These embodiments, offered not to limit but only to exemplify and teach the invention, are shown and described in sufficient detail to enable those skilled in the art to implement or practice the invention. Thus, where appropriate to avoid obscuring the invention, the description may omit certain information known to those of skill in the art.

Exemplary Voltage Regulator Circuit

Figure 1:
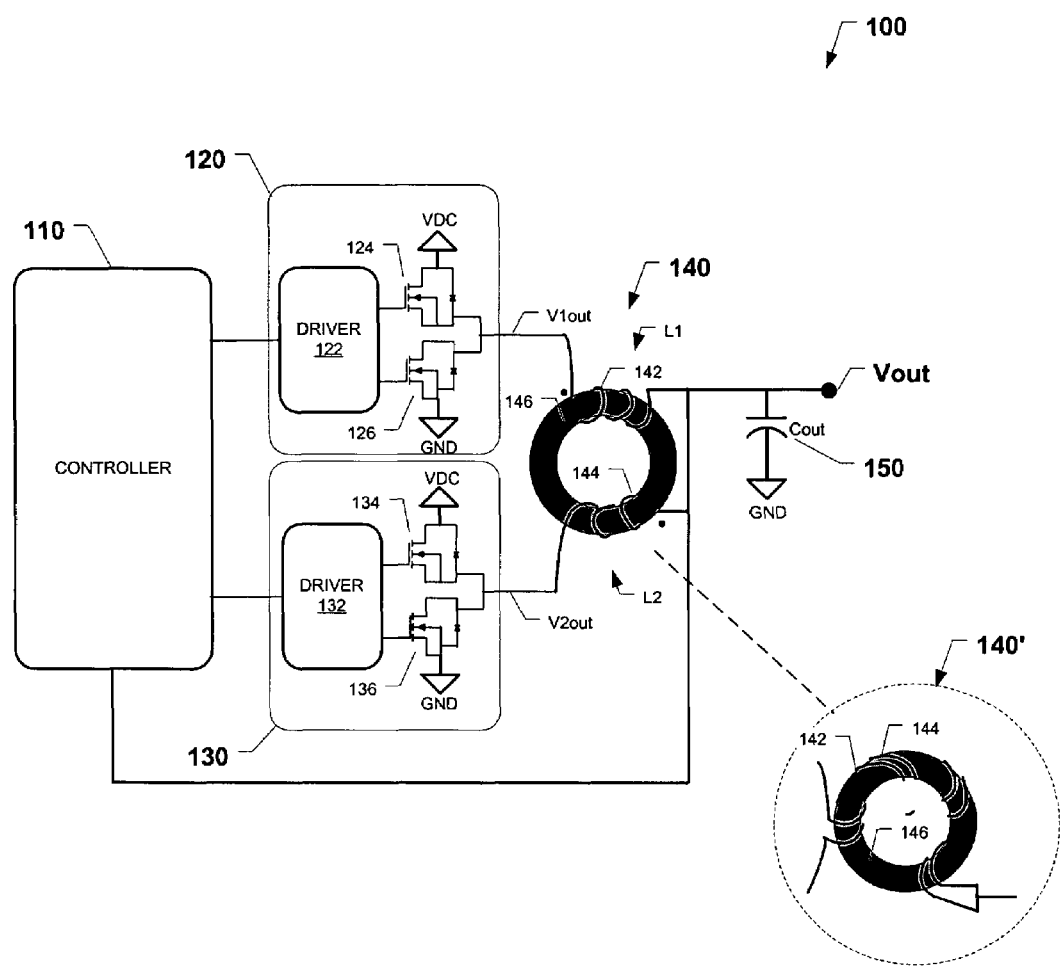
FIG. 1 is a circuit diagram of an exemplary two-phase switching voltage regulator circuit corresponding to one or more embodiments of the present invention.

FIG. 1 shows an exemplary two-phase switching voltage regulator circuit 100. Circuit 100 includes a controller 110, switching circuits 120 and 130, a dual toroidal inductor 140, an output capacitor 150, power supply nodes VDC and GND, and an output node Vout.

Controller 110 includes conventional or advanced circuitry for sensing the voltage and/or current at output node Vout and controlling the switching of switching circuits 120 and 130, both of which may operate in the 200 Kilohertz to 1 Megahertz range. Controller 110 includes circuitry for decreasing the magnitude of Vout as the load current increases. This optional feature is desirable, not only for increasing battery life, but also for reducing system design costs by reducing maximum thermal envelope. It also increases the amount of headroom available to accommodate load transients, and thus reduces the amount of required bulk output capacitance.

Switching circuit 120 includes a driver 122, switching transistors (more generally switches) 124 and 126, and an output node V1out. Switching transistors 124 and 126, which are metal-oxide-semiconductor field-effect transistors (mosfets) in the exemplary embodiment, are coupled in series between power supply nodes VDC and GND.

Switching circuit 130 similarly includes a driver 132, switching transistors 134 and 136, and an output node V2out. Switching transistors 134 and 136, which are metal-oxide-semiconductor field-effect transistors (mosfets) in the exemplary embodiment, are coupled in series between power supply nodes VDC and GND.

More specifically, each switching transistor includes a control node, such as a gate, and two controllable nodes, such as a source and a drain. Transistor 124 has its gate coupled to an output of driver 122, its drain coupled to supply node VDC, and its source coupled to the drain of transistor 126 and to output V1out. Transistor 126 has its gate coupled to another output of driver 122, and its source coupled to supply node GND. Transistor 134 has its gate coupled to an output of driver 132, its drain coupled to supply node VDC, and its source coupled to the drain of transistor 136 and to output V2out. Transistor 136 has its gate coupled to another output of driver 132, and its source coupled to supply node GND. Outputs V1out and V2out are coupled respectively to first and second nodes (or terminals) of dual toroidal inductor 140.

Dual toroidal inductor 140, which defines substantially equal inductances L1 and L2, includes conductors 142 and 144 that are manually and oppositely wound or coiled the same number of turns around a toroidal or donut-shaped magnetic core 146. In the exemplary embodiment, L1 and L2 are in the 200-800 nano-henry range with the conductors providing a direct-current (DC) resistance of approximately 500-1000 milliohms. A coupling factor in the range of 0.5 to 0.9 is generally desired; some embodiments use the following inclusive coupling factor ranges: 0.5-0.7, 0.6-0.8, 0.7-0.9, and 0.8-0.9. Other embodiments may use other ranges.

In the exemplary embodiment, magnetic core 146 takes the form of a substantially circular closed loop with a nominal inner diameter of approximately three to four millimeters and a nominal outer diameter of approximately seven millimeters. Some embodiments may use other core shapes, such as oval or elliptical. The cross-section of the core can be substantially circular with a nominal diameter of two millimeters. However, some embodiments employ other cross sections, for example: square, rectangular, oval or elliptical. The exemplary core consists essentially of a ferromagnetic material, such as Molypermalloy Powder (MPP). Some embodiments form the core of iron powder, power ferrite, or sendust. In some embodiments, the closed loop may be only substantially closed and/or only generally circular.

Still other variations are used in other embodiments. FIG. 1 shows that dual toroidal inductor 140 may be replaced with dual toroidal inductor 140', which has a bifilar conductor configuration. The spacing between conductors 142 and 144 can be used to set the coupling factor as desired. Conductors can be electrically coupled at one end to define output node Vout.

Output node Vout, which in operation is generally coupled to a load, such as the power pin of microprocessor or other circuit, is coupled to supply node GND via output capacitor 150. In the exemplary embodiment, capacitor 150 comprises two or more banks of capacitors coupled in parallel. For example, some embodiments include a low frequency (less than 200 KHz) bulk capacitance, a mid-frequency (less than 10 MHz) bank of capacitors, and a high-frequency bank of capacitors. The low frequency bulk capacitors may include six 330-microfarad, 9 milliohm tantalum, electrolytic, or Polymerized Organic Semiconductor (POSCAP) type capacitors; the mid-frequency bank may include 30 22-microfarad multilayer ceramic capacitors (MLCC). The high-frequency bank of capacitors are generally integrated as part of a processor integrated circuit. Notably, in some embodiments, the dual toroidal inductor allows one to omit the low frequency bank of capacitors completely, not only saving considerable space on a printed circuit board, such as a motherboard, but also significantly reducing manufacturing cost.

In operation, voltage regulator circuit 100 provides a substantially constant output voltage which generally has lower output ripple due to the current cancellation effect within dual toroidal inductor 140 that reduces or minimizes peak current ripple. The current cancellation effect stems from generating opposite flowing currents in conductors 142 and 144, which thus produce opposing magnetic fluxes that are substantially equal and confined to the toroidal shaped magnetic core. Additionally, peak current reductions generally also reduce switching losses in the mosfets of switching circuits 120 and 130, yielding improved power-conversion efficiency.

Exemplary System Incorporating Voltage Regulator Circuit

Figure 2:
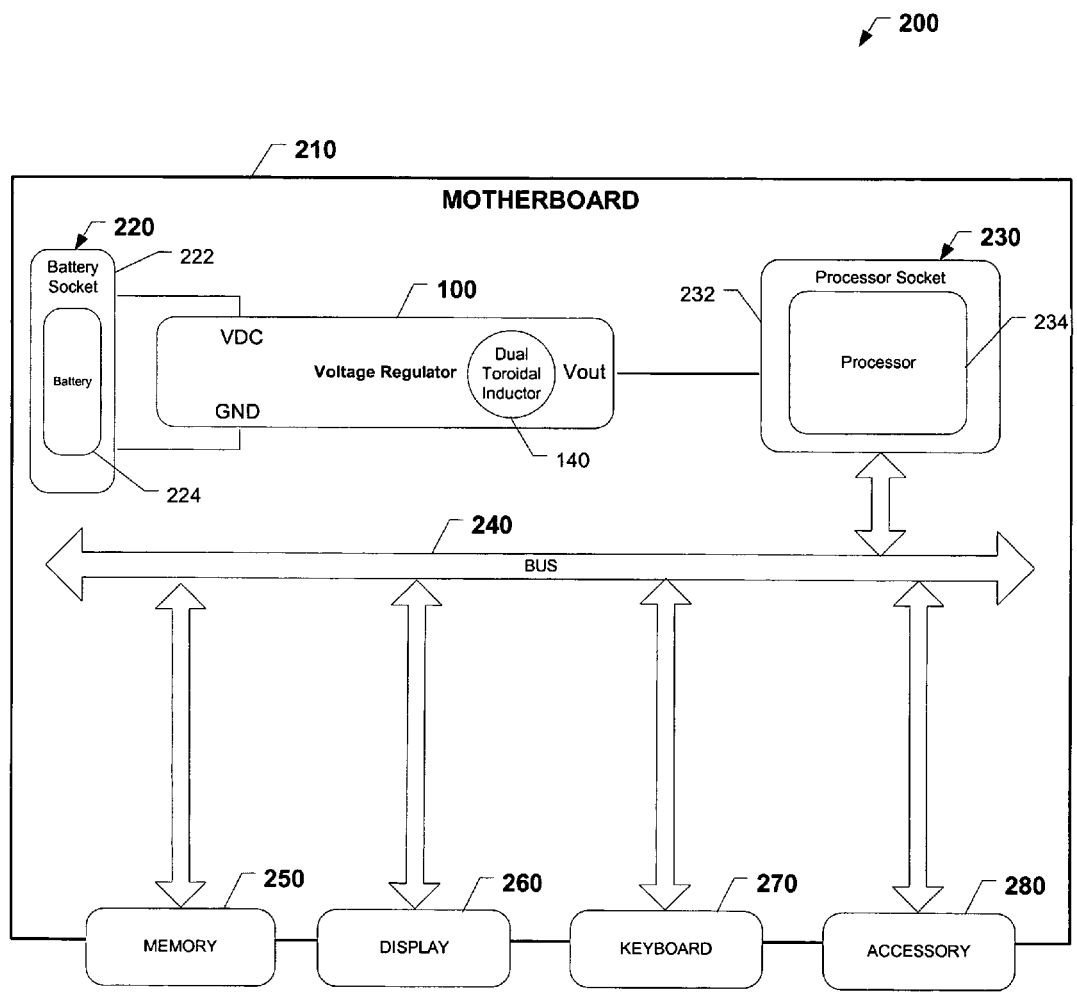
FIG. 2 is a block diagram of an exemplary computer system which incorporates a voltage regulator circuit and thus corresponds to one or more embodiments of the present invention.

FIG. 2 shows an exemplary mobile computing system 200, which incorporates voltage regulator circuit 100. (Circuit 100 can also be embodied within a non-mobile system and/or a system that does not use a battery.) System 200, can take the form of a notebook or laptop computer, personal digital assistance, mobile telephone, or other battery-powered appliance or entertainment device. Specifically, system 200 includes a motherboard (printed circuit board) 210. Motherboard 210, which may take a variety of shapes and sizes, includes a battery assembly 220, voltage regulator circuit 100, a processor assembly 230, a bus 240, a memory assembly 250, a display assembly 260, a keyboard assembly 270, and an accessory assembly 280.

More specifically, battery assembly 220 includes a battery connector or battery socket 222 and a rechargeable battery 224. Other embodiments may use different kinds of power sources, such as a fuel cell, a solar array, a super capacitor, a combination of two or more power sources, etc. In some embodiments, battery 224 is installed within socket 222 by an end user of system 200. Socket 222 is electrically connected to power supply nodes VDC and GND of voltage regulation circuit 100, which includes dual toroidal inductor 140 and has its output Vout coupled to a power pin (not shown separately) of processor assembly 230, more precisely processor socket (or connector) 232. In some embodiments, dual toroidal inductor 140 is directly soldered onto the motherboard; however, other embodiments could use specific sockets.

Processor assembly 230 also includes a processor 234 which mechanically engages and electrically connects with socket 232. In some embodiments, processor 232 is sold and installed separately from other components of motherboard 210. Processor assembly 230 is coupled to bus 240.

Bus 240 couples processor assembly 230 to memory assembly 250, display assembly 260, keyboard assembly 270, and accessory assembly 280. Assemblies 250-280 are shown on the boundary of motherboard 210 to indicate that they may be wholly or only partly positioned on the motherboard. In some embodiments, the motherboard may only include sockets or connectors for one or more of the corresponding assemblies; whereas in other embodiments, the motherboard includes the sockets and one or more corresponding integrated circuits or other devices.

Memory assembly 250 includes one or more memory sockets or connectors and corresponding volatile or non-volatile memory circuits, data-storage device, such as hard drives or removable storage media. In general, memory assembly 250 can include any form of volatile or non-volatile data-storage.

Display assembly 260 includes one or more sockets and connectors and/or corresponding drivers and/or screens. In some embodiments, connectors and/or drivers are for liquid-crystal displays (LCD).

Keyboard assembly 270 includes one or more sockets, connectors, and/or corresponding drivers, keyboards or keypads.

Accessory assembly 280 includes sockets and interface circuitry for permanently or detachably adding functional modules to system 200. Exemplary modules include mobile telephone transceivers, network communicators, memory extensions, infrared transceivers, digital cameras, barcode readers, digital media players, and so forth.

The embodiments described in this document are intended only to illustrate and teach one or more ways of practicing or implementing the present invention, not to restrict its breadth or scope. The actual scope of the invention, which embraces all ways of practicing or implementing the teachings of the invention, is defined only by the issued claims and their equivalents. Additionally, to comply with 37 C.F.R. Section 1.72(b), this document includes an abstract that is intended only for efficiently communicating the technical nature of the document. It is not intended for use in limiting or interpreting the scope or meaning of the claims.

What is claimed is:

1. A multi-stage voltage regulator circuit comprising:

first and second power supply nodes and first and second switching circuits, with the first and second power supply nodes to couple to a battery and with the switching circuits coupled in parallel between the first and second power supply nodes and having respective first and second output nodes;

first and second inductors, each having first and second nodes, with the first nodes coupled respectively to the first and second output nodes, the second nodes coupled directly together to define a voltage output node, and the first and second inductors having a common toroidal shaped magnetic core; and a capacitor coupled between the voltage output node and the second power supply node.

2. The circuit of claim 1, wherein the common toroidal shaped magnetic core is substantially circular and has a substantially circular cross-section.

3. The circuit of claim 1, wherein the common toroidal shaped magnetic core consists essentially of a molypermalloy powder material.

4. The circuit of claim 2, wherein the first and second inductors are substantially equal in inductance.

5. The circuit of claim 3, wherein the first and second inductors comprise respective first and second conductors that are wound in a bifilar configuration around the core and coupled to conduct current in opposite directions.

6. A system comprising:

a processing unit having a power supply node;

a multi-stage voltage regulator circuit including first and second power supply nodes and first and second switching stages, with the first and second power supply nodes to couple to a battery and with the switching stages coupled in parallel between the first and second power supply nodes and having respective first and second output nodes;

first and second inductors, each having first and second nodes, with the first nodes coupled respectively to the first and second output nodes, the second nodes directly coupled to the power supply node of the processing unit, and the first and second inductors having a common toroidal shaped magnetic core; and a capacitance coupled between the power supply node of the processing unit and the second power supply node.

7. The system of claim 6, further comprising a printed circuit board, wherein the multistage voltage regulator and the first and second inductors are mounted on the printed circuit board.

8. The system of claim 6, wherein the common toroidal shaped magnetic core is substantially circular and has a substantially uniform circular cross-section.

9. The system of claim 6, wherein the common toroidal shaped magnetic core consists essentially of a molypermalloy powder material.

10. The system of claim 6, wherein the first and second inductors are substantially equal in inductance.

11. The system of claim 6, wherein the first and second inductors comprise respective first and second conductors that are wound in a bifilar configuration around the core and coupled to conduct current in opposite directions.

12. The system of claim 6, further comprising an accessory coupled to the processing unit wherein the accessory comprises a wireless transceiver.

13. The system of claim 6, wherein the capacitance comprises:

one or more banks of capacitors coupled in parallel between the power supply node and the second power supply node, wherein the one or more banks of capacitors excludes any low-frequency bulk capacitors for operation at frequencies less than 200 KHz.

* * * * *